(12) United States Patent
Schmidt et al.

(10) Patent No.: US 8,323,796 B2
(45) Date of Patent: Dec. 4, 2012

(54) HIGH TEMPERATURE REFRACTORY COATINGS FOR CERAMIC SUBSTRATES

(75) Inventors: Wayde R. Schmidt, Pomfret Center, CT (US); Tania Bhatia, Middletown, CT (US); Xia Tang, West Hartford, CT (US); David C. Jarmon, Kensington, CT (US); Owen B. Donahue, Mystic, CT (US)

(73) Assignee: United Technologies Corporation, Hartford, CT (US)

( * ) Notice: Subject to any disclaimer, the term of this patent is extended or adjusted under 35 U.S.C. 154(b) by 1509 days.

(21) Appl. No.: 11/778,692

(22) Filed: Jul. 17, 2007

(65) Prior Publication Data
US 2009/0130446 A1 May 21, 2009

(51) Int. Cl.
*B32B 9/00* (2006.01)
(52) U.S. Cl. ...................................... 428/408
(58) Field of Classification Search .......... 428/408; 427/376.2
See application file for complete search history.

(56) References Cited

U.S. PATENT DOCUMENTS

| | | | |
|---|---|---|---|
| 4,126,652 A | 11/1978 | Oohara | |
| 4,482,669 A | 11/1984 | Seyferth | |
| 4,482,689 A | 11/1984 | Haluska | |
| 4,589,900 A | 5/1986 | Brennan | |
| 4,892,790 A * | 1/1990 | Gray | 428/548 |
| 5,045,399 A | 9/1991 | Niebylski | |
| 5,089,047 A | 2/1992 | Buljan | |
| 5,201,947 A | 4/1993 | Niebylski | |
| 5,292,691 A | 3/1994 | Hecht | |
| 5,622,751 A * | 4/1997 | Thebault et al. | 427/376.2 |
| 6,284,323 B1 | 9/2001 | Maloney | |
| 6,627,126 B2 | 9/2003 | Schmidt | |
| 6,924,040 B2 | 8/2005 | Maloney | |
| 7,060,360 B2 | 6/2006 | Eaton | |
| 2002/0098291 A1 | 7/2002 | Paul | |
| 2003/0062401 A1* | 4/2003 | Hasz et al. | 228/254 |
| 2005/0064245 A1* | 3/2005 | Campbell | 428/697 |

OTHER PUBLICATIONS

U.S. Appl. No. 11/455,049, filed Jun. 16, 2006.
U.S. Appl. No. 11/567,282, filed Dec. 6, 2006.

* cited by examiner

*Primary Examiner* — Maria Veronica Ewald
*Assistant Examiner* — Daniel H Miller
(74) *Attorney, Agent, or Firm* — Carlson, Gaskey & Olds PC

(57) ABSTRACT

A composite article includes a substrate and a protective layer on the substrate. The protective layer includes a non-oxide ceramic matrix and a refractory phase within the non-oxide ceramic matrix.

9 Claims, 1 Drawing Sheet

US 8,323,796 B2

HIGH TEMPERATURE REFRACTORY COATINGS FOR CERAMIC SUBSTRATES

This invention was made with government support under Contract No. F33615-01-D-5802, Subcontract No. S-709-020-001 awarded by the United States Air Force. The government therefore has certain rights in this invention.

BACKGROUND OF THE INVENTION

This invention relates to protective coatings and, more particularly, to ceramic composite protective coatings and methods of manufacture.

Components, such as aerospace components, typically utilize protective coatings to protect the component from detrimental effects caused by high temperatures and corrosive or erosive conditions. For example, aerospace components typically include one or more coating layers that resist oxidation of the underlying component to thereby enhance durability or maintain efficient operation of the component.

Types of protective coatings that are used to protect ceramic components are silica and silica-containing glasses. Although effective at relatively low temperatures, the silica and silica-containing glasses may soften or melt if the temperature exceeds 1200° F. (650° C.) and become less effective as protective coatings. Alternatively, the protective coating may be composed of a refractory silicide in a glassy matrix. However, while silicide containing layers may improve the temperature capability of the coating, they do not perform well at temperatures exceeding 3000° F. (1650° C.). Also, under certain situations such as high Mach environments, glass-based coatings could erode off the component surface, thereby being non-protective, and thus increasing the likelihood of premature failure of the component.

Accordingly, there is a need for a protective coating having enhanced oxidation resistance at elevated temperatures and a method for manufacturing the protective coating. This invention addresses those needs while avoiding the shortcomings and drawbacks of the prior art.

SUMMARY OF THE INVENTION

An example composite article includes a substrate and a protective layer on the substrate. The protective layer includes a non-oxide ceramic matrix and a refractory phase within the non-oxide ceramic matrix. For example, the substrate is a ceramic matrix composite, the non-oxide ceramic matrix is silicon carbide, silicon carbonitride, hafnium carbide, boron silicon carbonitride, and the refractory phase is boron, silicon, titanium, hafnium, zirconium, molybdenum, niobium, tantalum, or tungsten.

An example composition for manufacturing a composite of the non-oxide ceramic matrix and a refractory phase includes a preceramic polymer for forming the non-oxide ceramic matrix and a refractory material dispersed within the preceramic polymer. In one example, the refractory material is a metal as mentioned above, or an oxide, boride, silicide or carbide of the refractory metal.

An example method of manufacturing the composite article includes pyrolyzing the preceramic polymer to form the non-oxide ceramic matrix and a byproduct, and reacting the refractory material with the byproduct to form the refractory phase within the non-oxide ceramic matrix.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
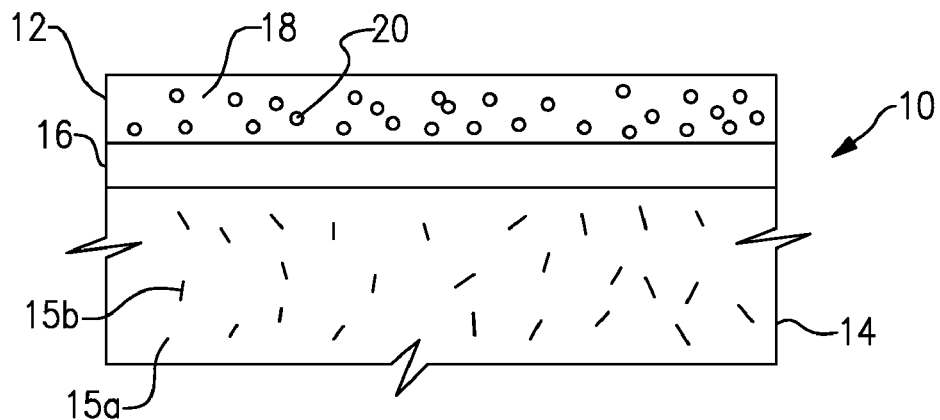
FIG. 1 illustrates selected portions of a composite article.

FIG. 1 illustrates selected portions of an example composite article 10 having a protective layer 12. Several non-limiting examples of potential applications of the composite article 10 include components for aerospace, hypersonics, rockets, scramjets, functionally graded ceramic structures, catalytic structures, reactors, airfoils, and heat exchangers.

In the disclosed example, the protective layer 12 is disposed on a substrate 14. Optionally, a silicate layer 16 is disposed between the protective layer 12 and the substrate 14. In one example, the silicate layer 16 includes borosilicate glass. For example, the borosilicate glass includes a composition disclosed in co-pending application Ser. No. 11/603,622.

In the disclosed example, the substrate 14 is a ceramic matrix composite that includes a carbon matrix 15a and silicon carbide reinforcement 15b within the carbon matrix 15a. Although a particular type of ceramic matrix composite and composite structure are disclosed, it is to be understood that other types of ceramics or ceramic composites or non-ceramic composites and other structures may be used.

The protective layer 12 includes a non-oxide ceramic matrix 18 and a refractory phase 20 within the non-oxide ceramic matrix 18. The composite of the non-oxide ceramic matrix 18 and the refractory phase 20 provides oxidation protection of the underlying substrate 14 at temperatures of about 3000° F. (1650° C.) and greater. The protective layer 12 may also provide protection against one or more of erosion, moisture, corrosion and high thermal loads or heat flux.

The non-oxide ceramic matrix 18 may be selected from any of a variety of different types of non-oxide ceramic materials. For example, the non-oxide ceramic matrix 18 is silicon carbide, silicon carbonitride, hafnium carbide, hafnium carbonitride, or boron silicon carbonitride. Given this description, one of ordinary skill in the art will recognize additional types of non-oxide ceramic material to suit their particular needs.

Likewise, the refractory phase 20 may be selected from any of a variety of different types of refractory materials. For example, the refractory phase 20 includes a refractory metal such as boron, silicon, titanium, hafnium, zirconium, molybdenum, niobium, tantalum, or tungsten. In a further example, the refractory metal is in the form of a silicide, an oxide, a boride, or a carbide compound.

The relative amounts of the non-oxide ceramic matrix 18 and the refractory phase 20 may be varied during manufacturing to produce the protective layer 12 with a desired composition. In one example, the protective layer 12 includes about 50-95 vol % of the non-oxide ceramic matrix 18 and about 10-50 vol % of the refractory phase 20. Higher volumes of the refractory phase within the given range tend to increase the thermal resistance of the protective layer 12 to provide oxidation and/or erosion resistance at elevated temperatures.

Figure 2:
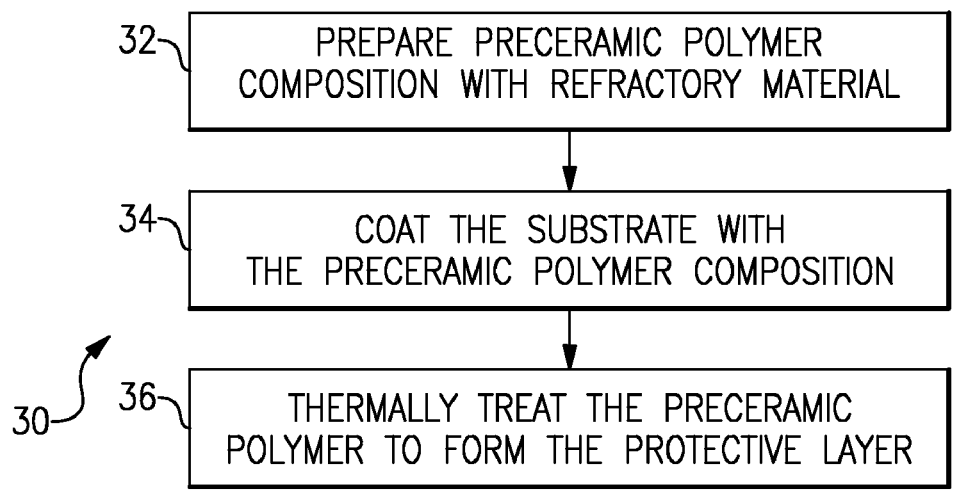
FIG. 2 illustrates an example method for forming a protective layer of a composite article.

In the disclosed example, the protective layer 12 is formed from a preceramic polymer. FIG. 2 illustrates one example method 30 for forming the protective layer 12 from a preceramic polymer. In this example, the preceramic polymer composition is prepared at step 32 by combining a preceramic polymer with a refractory material that will later form the refractory phase 20 within the non-oxide ceramic matrix 18. For example, the refractory material includes a refractory metal such as boron, silicon, titanium, hafnium, zirconium, molybdenum, niobium, tantalum, or tungsten. In a further example, the refractory metal is in the form of a silicide, an oxide, a boride, or a carbide. Alternatively, no refractory material is mixed with the preceramic polymer. Organometallic compounds (such as Hf-containing alkoxides (e.g. hafnium ethoxide) or alkane dionates (e.g. hafnium 2,4 pentanedionate) may also be added to the preceramic polymer composition to provide a source of refractory metal.

The relative amounts of the preceramic polymer and the refractory material may be varied at step 32, depending upon the desired composition of the protective layer 12. In one example, the composition includes about 5-95 wt % of the preceramic polymer and about 5-95 wt % of the refractory material, totaling 100%. In a further example, the composition includes about 50-95 wt % of the preceramic polymer and about 5-50 wt % of the refractory material, totaling 100%.

The type of preceramic polymer used depends upon the type of non-oxide ceramic matrix 18 that is desired. For example, if the non-oxide ceramic matrix 18 is comprised of carbon, silicon carbide, silicon carbonitride, boron silicon carbonitride, hafnium carbide or hafnium carbonitride, a corresponding type of preceramic polymer is selected to produce the non-oxide ceramic matrix 18. For example, the preceramic polymer is a phenolic, polysilane, polycarbosilane, polysilazane, or a polyborosilazane. Additionally, two or more types of preceramic polymers may be blended to control the composition of the ceramic matrix. Chemical modifications to vary the stoichiometry of the preceramic polymers are also contemplated. For example, polysilanes or polycarbosilanes highly functionalized with carbon-containing groups are contemplated.

The mixture of the preceramic polymer and refractory material is then coated onto the substrate 14, or onto the silicate layer 16 if one is used, at step 34. The mixture may be applied in a known manner, such as by painting, dipping, spraying, rolling, or other known technique. Optionally, the viscosity of the mixture may be modified in a known manner using solvents, surfactants, dispersants, or other additives to modify the mixture for a desired type of coating method.

Step 32, step 34, or both may be repeated as desired to provide additional coating layers for a desired thickness of the protective layer 12 or to provide layers having different compositions, for example. Subsequently, at a thermal treatment step 36, the coating is heated at a temperature sufficient to transform the preceramic polymer into the non-oxide ceramic matrix 18. Such thermal treatment is also referred to as pyrolysis. The selected temperature may depend upon the type of preceramic polymer used and the type of refractory material selected, as will be described below. In some examples, the selected temperature is between about 1000° C. and may exceed 2000° C. Step 36 may also be repeated as desired under different conditions such as heating and cooling rates, temperature, atmosphere and time at temperature. For example, heating in relatively inert atmosphere such as argon may minimize oxidization of the refractory material, preceramic polymer, byproducts or refractory phases. In use or upon exposure to an oxidizing environment, the oxidization product may be desirable to provide additional protection. For example, hafnium in the presence of boron or silicon may form oxygen containing phases such as hafnium oxide, hafnium silicate, hafnium borosilicate, hafnium borate, borosilicates, silica or other phases.

In one example, the selected preceramic polymer is a non-stoichiometric composition such that upon pyrolysis at step 36, the preceramic polymer forms the non-oxide ceramic matrix 18 and a reactive byproduct. For example, the byproduct is excess carbon that then is available to react with the refractory material within the preceramic polymer to form the refractory phase 20. The reaction and the resulting type of refractory phase 20 depends on the type of refractory material and the pyrolysis temperature. For example, a refractory metal may react with the carbon to form a refractory carbide as the refractory phase 20. Additional examples are provided in U.S. Pat. No. 6,627,126. Likewise, refractory silicides, oxides, carbides, or borides used as the refractory material may react to form other silicides, oxides, carbides, or borides as the refractory phase 20. In one example, an oxide form of the refractory phase 20 increases bonding strength between the protective layer 12 and the silicate layer 16.

The following examples illustrate a few possible refractory phases 20 based on hafnium as the refractory material used with the preceramic polymer. However, given this description, one of ordinary skill in the art will be able to recognize other types of refractory phases 20 that can be produced using the refractory materials disclosed herein or other types of refractory materials.

In one example, the refractory material includes hafnium metal, and the temperature is less than about 1000° C. (1832° F.) and the atmosphere is argon. At least a portion of the hafnium metal reacts with carbon byproduct from the pyrolysis of the non-stoichiometric preceramic polymer to form hafnium carbide (HfC) as the refractory phase 20. Exposure to increased temperature and times generally increases the extent of the reaction, as well as the crystal size and the extent of crystallinity. This trend is also expected for the subsequent examples.

In another example, the refractory material includes hafnium oxide ($HfO_2$), and the temperature is greater than about 1700° C. (3092° F.). At least a portion of the hafnium oxide carbothermally reduces with carbon byproduct from the pyrolysis of the non-stoichiometric preceramic polymer to form hafnium carbide as the refractory phase 20.

In another example, the refractory material includes hafnium oxide ($HfO_2$) and silica, and the temperature is less than 1000° C. (1832° F.). The hafnium oxide, silica, and carbon byproduct from the pyrolysis of the non-stoichiometric preceramic polymer react to form hafnium carbide and hafnium silicate ($HfSiO_4$) as the refractory phase 20.

In another example, the refractory material includes hafnium boride ($HfB_2$), and the temperature is greater than about 2000° C. (3632° F.). At least a portion of the hafnium boride and carbon byproduct from the pyrolysis of the non-stoichiometric preceramic polymer react to form hafnium carbide and boron carbide ($B_4C$) as the refractory phase 20.

In another example, the refractory material includes hafnium silicide ($HfSi_2$), and the thermal treatment conditions are suitable for converting the hafnium silicide (thought to be a temperature less than 2500° C.). At least a portion of the hafnium silicide and carbon byproduct from the pyrolysis of the non-stoichiometric preceramic polymer react to form hafnium carbide as the refractory phase 20.

In another example, the refractory material includes hafnium containing borosilicate and the treatment temperature is suitable for causing a phase separation of the refractory material into hafnium silicide ($HfSi_2$) and hafnium diboride ($HfB_2$). At least a portion of the hafnium silicide and carbon byproduct from the pyrolysis of the non-stoichiometric preceramic polymer react to form hafnium carbide as the refractory phase 20.

In the disclosed examples, the amount of excess byproduct such as carbon may be estimated or determined experimentally, such that the amount of refractory material that is added to the preceramic polymer stoichiometrically corresponds to the amount of excess byproduct to produce a desired amount of the refractory phase 20. For example, about 7.8 grams of silicon carbide preceramic polymer (available from Starfire® Systems) is mixed with about 28 grams of hafnium metal. The mixture is mechanically blended to create a uniform dispersion and coated onto a substrate. The coating is then thermally treated at a heating rate 10° C./minute at a temperature of about 1000° C. to 1150° C. (1832° F. to 2102° F.) in argon to convert the preceramic polymer into about 1.6 moles of silicon carbide and approximately 3.1 moles of excess carbon. The amount of hafnium metal added corresponds approximately to the 3.1 moles of excess carbon such that there is a stoichiometric amount of carbon to react with the hafnium metal to form hafnium carbide as the refractory phase 20 within the non-oxide ceramic matrix 18. Given this description, one of ordinary skill in the art will be able to determine suitable combinations of preceramic polymers and refractory materials to form a desired composition of the protective layer.

In another example, the preceramic polymer is not mixed with the refractory material at step 32. Instead, the preceramic polymer is applied to the substrate 14 or silicate layer 16 as described above. In this example, during the pyrolysis step 36, excess byproduct formed during pyrolysis, such as carbon, reacts with one or more elements in the underlying substrate 14 or silicate layer 16 to form the refractory phase 20. The refractory phase 20 may be more concentrated near the interface between the protective layer 12 and the silicate layer 16 or the substrate 14. If a silicate layer 16 is used, the composition of this layer may be tailored to intentionally react with the components of the preceramic polymer coating. For example, in the copending application Ser. No. 11/603,622, the silicate layer includes molybdenum disilicide ($MoSi_2$).

The disclosed examples thereby provide various compositions and methods of manufacture of the protective layer 12 for resisting oxidation of the underlying substrate 14. Due to the formation of the protective layer 12 using a preceramic polymer, the protective layer 12 provides relatively low temperature processing (no melting of a refractory metal is required), and processing that can be easily adapted to produce different desired compositions. Additionally, various modifications of the disclosed examples are possible by varying the compositions of the preceramic polymer and refractory materials, heating times, heating rates, temperatures, reactive atmospheres, etc. Also, various post-processing steps may be used to further enhance the protective layer 12, such as processes to control crystallinity, grain size, pore size, and extent of porosity (such as electrophoretic deposition of another ceramic phase within pores of the protective layer 12).

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A composite article comprising:
a substrate; and
a protective layer on the substrate, the protective layer including a non-oxide ceramic matrix and at least one refractory phase within the non-oxide ceramic matrix, the refractory phase comprising hafnium carbide and hafnium silicate.

2. The composite article as recited in claim 1, wherein the non-oxide ceramic matrix comprises at least one of carbon, silicon carbide, silicon carbonitride, hafnium carbide, hafnium carbonitride, or boron silicon carbonitride.

3. The composite article as recited in claim 1, wherein the substrate comprises a ceramic matrix composite.

4. The composite article as recited in claim 3, wherein the ceramic matrix composite comprises a carbon matrix and silicon carbide reinforcement within the carbon matrix.

5. The composite article as recited in claim 1, wherein the protective layer comprises about 50-90 vol % of the non-oxide ceramic matrix and about 10-50 vol % of the refractory phase.

6. The composite article as recited in claim 1, further comprising a silicate layer between the substrate and the protective layer.

7. The composite article as recited in claim 6, wherein the silicate layer comprises borosilicate glass.

8. The composite article as recited in claim 1, wherein the non-oxide ceramic matrix comprises at least one of hafnium carbide, hafnium carbonitride or boron silicon carbonitride.

9. A composite article comprising:
a substrate; and
a protective layer on the substrate, the protective layer including a non-oxide ceramic matrix and at least one refractory phase within the non-oxide ceramic matrix, the refractory phase comprising hafnium carbide and hafnium silicate.

* * * * *